US007067769B2

(12) United States Patent  
Sands et al.

(10) Patent No.: US 7,067,769 B2
(45) Date of Patent: Jun. 27, 2006

(54) GRILLING COMPONENT

(75) Inventors: Jeffrey L. Sands, Freeport, IL (US); Ronald J. Glavan, Rockton, IL (US); Henry Thomas Ewald, Roselle, IL (US); Ronald J. Dorsten, Oak Park, IL (US); Curtis J. Scadden, Madison, WI (US); Richard J. Lunden, Brimfield, MA (US); Ad Verkuylen, Boise, ID (US)

(73) Assignee: Carrier Commercial Refrigeration Inc., Charlotte, NC (US)

( * ) Notice: Subject to any disclaimer, the term of this patent is extended or adjusted under 35 U.S.C. 154(b) by 274 days.

(21) Appl. No.: 10/726,017

(22) Filed: Dec. 2, 2003

(65) Prior Publication Data

US 2005/0115418 A1    Jun. 2, 2005

(51) Int. Cl.
*A47K 37/00*  (2006.01)
*A47K 37/06*  (2006.01)
*F27B 9/36*   (2006.01)

(52) U.S. Cl. ................ 219/388; 219/403; 99/386
(58) Field of Classification Search ................ None
See application file for complete search history.

(56) References Cited

U.S. PATENT DOCUMENTS

| | | | | | |
|---|---|---|---|---|---|
| 3,646,880 | A | * | 3/1972 | Norris | 99/349 |
| 3,739,712 | A | * | 6/1973 | Duning | 99/349 |
| 4,072,092 | A | * | 2/1978 | Kohli et al. | 99/389 |
| 4,262,586 | A | * | 4/1981 | Miller et al. | 99/345 |
| 4,281,594 | A | * | 8/1981 | Baker et al. | 99/386 |
| 4,548,130 | A | * | 10/1985 | Diener et al. | 99/345 |
| 5,044,264 | A | * | 9/1991 | Forney | 99/349 |
| 5,458,051 | A | * | 10/1995 | Alden et al. | 99/349 |
| 5,588,354 | A | * | 12/1996 | Stuck et al. | 99/386 |
| 5,847,362 | A | * | 12/1998 | Sissons et al. | 219/388 |
| 6,201,218 | B1 | * | 3/2001 | Chandler et al. | 219/388 |
| 6,223,650 | B1 | * | 5/2001 | Stuck | 99/386 |
| 6,281,478 | B1 | * | 8/2001 | Chandler et al. | 219/388 |

FOREIGN PATENT DOCUMENTS

SE    513 106    7/2000

* cited by examiner

*Primary Examiner*—Joseph Pelham
(74) *Attorney, Agent, or Firm*—Carlson, Gaskey & Olds

(57) ABSTRACT

A vertical grilling component includes two grilling structures separated by a gap. Each grilling structure includes a heating component and a conveyor belt positioned around the heating components. The upper portion of one of the grilling structures is beveled approximately 0.8°. The grilling structures are slidable relative to the frame of the grilling component for cleaning, and the heating components are also removable from the grilling structures. The gap between the grilling structures is adjustable between two distances. The conveyor belts include a v-belt received in a groove of the pulleys to prevent lateral movement of the conveyor belt. The conveyor belts also include an edge seal around the outer edge of the conveyor belt. After grilling, seasoning is dispensed onto the grilled food item when detected by a sensor.

18 Claims, 8 Drawing Sheets

GRILLING COMPONENT

BACKGROUND OF THE INVENTION

The present invention relates generally to vertical grilling component having a beveled portion that grills frozen food.

Grills or griddles are used to cook various foods, such as hamburgers. In one prior grill, the sides of the food are grilled separately. The food is placed on a flat grill portion, grilling the side of the food that contacts the flat grill portion. After that side of the food is cooked, the food is manually flipped to cook the opposite side of the food. After the food is cooked, the food is manually removed from the grill for serving.

In another prior grill, both sides of the food are grilled simultaneously. After programming the type of food into a control unit, the food is placed on a lower grill portion. A platen having an upper grill portion is then lowered over the food, positioning the food between the upper and lower grill portions and simultaneously grilling both sides of the food. After lowering the platen, the distance between the upper and lower grill portions is automatically adjusted according to the type of food programmed into the control unit. After a predetermined amount of time has passed, the platen rises, and the food is manually removed from the grill.

Another prior grill employs a conveyor belt positioned over a heating component. The food is manually placed on the conveyor belt by an operator and grilled while the conveyor belt travels over the heating component.

Another prior grill includes two conveyor belts separated by a gap. As the food travels in the gap, the food is cooked. The flat grilling surfaces of the grill are usually parallel, creating a gap having a constant width. A drawback to this grill is that it is difficult to position the food in the opening of the gap.

SUMMARY OF THE INVENTION

A vertical grilling component includes two grilling structures separated by a gap. Each grilling structure includes a heating component and a conveyor belt moveable around each of the heating components. Each grilling structure also includes a drive pulley and a non-drive pulley to move the conveyor belts. Food items traveling in the gap between the two grilling structures are grilled by the heating components. The upper portion of one of the grilling structures has a beveled portion angled approximately 0.8° from the grilling surface of the grilling components.

The grilling structures are slidable along the frame of the grilling component to allow for cleaning. One of the grilling structures is removably attached to another component, such as a freezer that stores and cools the food items. When the grilling structures are attached, they do not slide relative to the frame. When the grilling structures are detached, one grilling component can slide horizontally along the frame relative to the grilling component attached to the component.

The heating components are also removable from the grilling structures. Each heating component includes two rails slidable along the tracks of the frame of the grilling structure. The heating components are retained in the grilling structures by a latching mechanism. The latching mechanism is released to allow the heating components to slide relative to the grilling structure to remove the heating components from the grilling structure.

The gap between the grilling structures is adjustable between two dimensions. One of the grilling structures includes a handle pivotally attached to the grilling structure by two arms. Each arm includes two bearings. The other of the grilling structures includes an attachment arm having two arched surfaces. When the grilling structures are attached, one of the arched surfaces of the attachment arm is received between the two bearings. The gap is adjusted between the two dimensions by moving the bearings between the two arched surfaces.

The conveyor belts of the grilling components include a v-belt proximate to each of the outer edges of the conveyor belt. The v-belts are received in a groove in the pulleys, preventing lateral movement of the conveyor belts during operation. The conveyor belts also include an edge seal around the outer edges of the conveyor belt to prevent grease and water in the gap from leaking into the heating component.

After grilling, the food items are dropped from the grilling component and onto an exit ramp. When a sensor detects a food item on the exit ramp, seasoning is dispensed onto the food item. The food item is then ready for serving.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
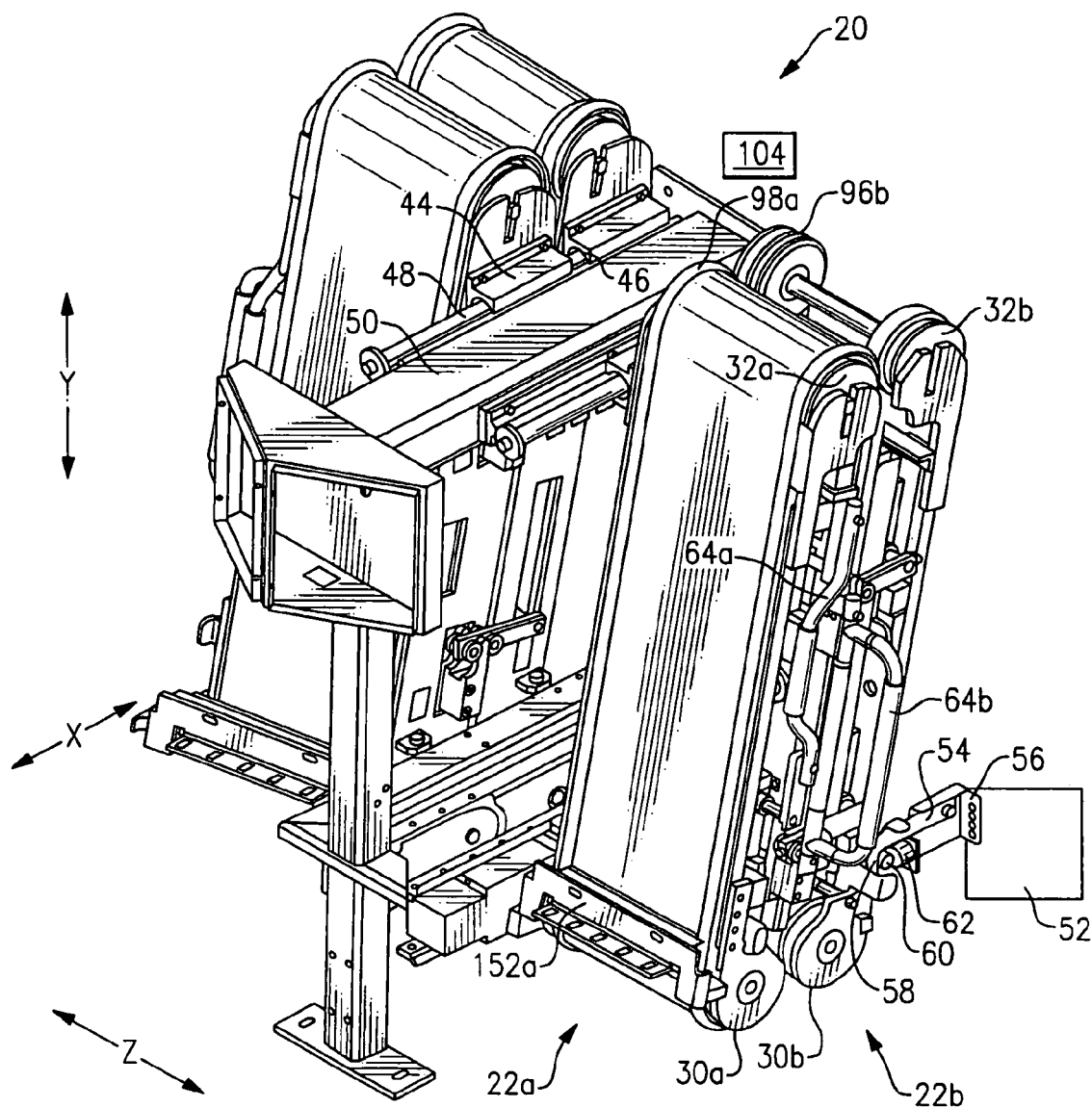
FIG. 1 schematically illustrates a perspective view of the grilling component of the present invention.

FIG. 1 schematically illustrates the vertical grilling component 20 of the present invention. The grilling component 20 includes two grilling structures 22a and 22b separated by a gap 24 that defines a cooking area. More than one grilling component 20 can be employed to increase cooking capacity.

Figure 2:
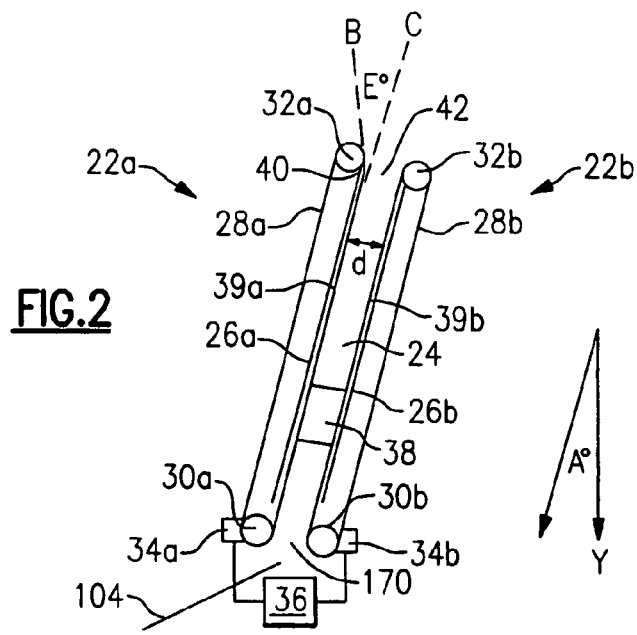
FIG. 2 schematically illustrates a side view of the grilling structures of the grilling component.

As shown in FIG. 2, each grilling structure 22a and 22b includes a heating component 26a and 26b, respectively. In one example, the heating components 26a and 26b are electric resistance heaters and heat to a temperature of 400° F. A conveyor belt 28a and 28b positioned around each of the heating components 26a and 26b, respectively, creates a surface that travels over the heating components 26a and 26b.

Preferably, the grilling structures 22a and 22b are obliquely oriented at an angle of A° from the vertical Y direction (i.e., up and down in FIGS. 1 and 2). In one example, the angle A is 5°. However, it is to be understood that other angles A are possible. Additionally, the grilling structures 22a and 22b have substantially the same length.

The conveyor belts 28a and 28b are preferably made of any suitable material having a low coefficient of thermal expansion. In one example, the conveyor belts 28a and 28bare made of non-stick coated Invar™ commercially available from Imphy S.A. Corporation of Paris, France. Invar™ is a metal alloy comprised of Iron and 36% Nickel, and may include other trace elements. In one example, the non-stick coating on the Invar™ is Teflon™ commercially available from E. I. DuPont Nemours and Company Corporation of Wilmington, Del. Invar has a low constant of thermal expansion and therefore expands very little when heated. Although Invar™ has been disclosed, it is to be understood that other materials having a low coefficient of thermal expansion can be used.

Each grilling structure 22a and 22b includes a drive pulley 30a and 30b, respectively, and a non-drive pulley 32a and 32b, respectively. The drive pulleys 30a and 30b are powered by respective drive motors 34a and 34b to move the conveyor belts 28a and 28b. A drive controller 36 provides a control signal to the drive motors 34a and 34b to synchronize the speed of the conveyor belts 28a and 28b.

Food items 38 traveling in the gap 24 between the conveyor belts 28a and 28b are heated and grilled by the heating components 26a and 26b. The food items 38 are squeezed within the gap 24 and therefore do not slip between the conveyor belts 28a and 28b during grilling.

The inner grilling surfaces 39a and 39b of the grilling structures 22a and 22b are substantially parallel and extend along the plane C. The upper portion 40 of the grilling structure 22a is beveled and deviates along the plane B. An angle E is defined between the plane B and the plane C. Preferably, the angle E is 0.8°. However, the angle E is illustrated as exaggerated for illustrative clarity. Alternately, the grilling structure 22b includes the beveled portion.

Food items 38 enter the gap 24 between the grilling structures 22a and 22b through an opening 42. The opening 42 is slightly larger than the gap 24, facilitating the entry of the food items 38 in the gap 24. Although the upper portion 40 of the grilling structure 22a is beveled, the food items 38 in the opening 42 contact both the grilling structures 22a and 22b when in the opening 42, increasing grilling efficiency. That is, the food items 38 are grilled when positioned in the opening 42, even through the opening 42 is slightly larger than the gap 24.

Returning to FIG. 1, the grilling structures 22a and 22b are movable along the x-axis to allow for cleaning of the grilling component 20. Each grilling structure 22a and 22b includes a slider 44 having an opening 46. The opening 46 of the slider 44 receives a rail 48 attached to the frame 50 of the grilling component 20, allowing the grilling structures 22a and 22b to slide relative to the frame 50. The opening 46 of the slider 44 is sized and shaped to receive the rail 48 and to allow the slider 44 to slide along the rail 48. In one example, the rail 48 has a circular cross-section and the opening 46 is circular.

Preferably, the grilling structure 22b is attached to a component 52 to prevent movement of the grilling structure 22b. A protruding portion 54 including a bracket 56 is attached to the component 52. In one example, the protruding portion 54 is attached to the component 52 by bolts. The protruding portion 54 includes a hooked arm 58 that is received over or hooked over a protrusion 60 on the grilling structure 22b, removably attaching the grilling structure 22b to the component 52. In one example, the component 52 is an automated freezer that stores and dispenses the food items 38 into the grilling component 20, such as described in co-pending patent application Ser. No. 10/725,954 entitled "Automated Freezer Component" filed on Dec. 2, 2003 and having. A stop 62 between the grilling structure 22b and the component 52 prevents damage to the grilling component 20 when the grilling structure 22b is slid towards the component 52. In one example, the stop 62 is made of rubber.

When the grilling component 20 is cleaned, the grilling structure 22a is detached from the grilling structure 22b, as described below. The grilling structure 22a can slide along the rail 48, as shown by the left set of grilling structures 22a and 22b of FIG. 3. An operator grabs a handle 64a of the grilling structure 22a and pulls the grilling structure 22a to slide the grilling structure 22a away from the grilling structure 22b. In this position, the grilling component 20 can be cleaned. The grilling structure 22b is secured to the component 52 and is not slid due to this attachment. After cleaning, the grilling structures 22a is reattached to the grilling structure 22b, as explained below, the grilling structure 22a is prevented from sliding.

The grilling structure 22b can be detached from the component 52 to also allow the grilling structure 22b to slide. The hooked arm 58 is lifted from the protrusion 60, detaching the grilling structure 22b from the component 52. The grilling structure 22b can then be slid relative to the frame 50. An operator would grab the handle 64b of the grilling structure 22b to slide the grilling structure 22b. The grilling structure 22b is reattached to the component 52 by moving the grilling structure 22b proximate to the component 52 and re-positioning the hooked arm 58 over the protrusion 60.

The heating components 26a and 26b are also moveable in the z direction relative to the grilling structures 22a and 22b, respectively, allowing the heating components 26a and 26b to be removed from the grilling structures 22a and 22b, respectively, for cleaning. Although only grilling structure 22b is described, it is to be understood that the grilling structure 22a includes the same features.

Figure 6:
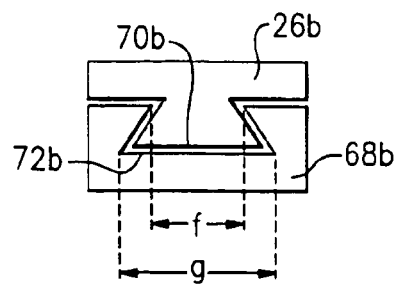
FIG. 6 schematically illustrates a cross-sectional view of the rail of the heating component received in the track of the frame of the grilling structure.
Figure 4:
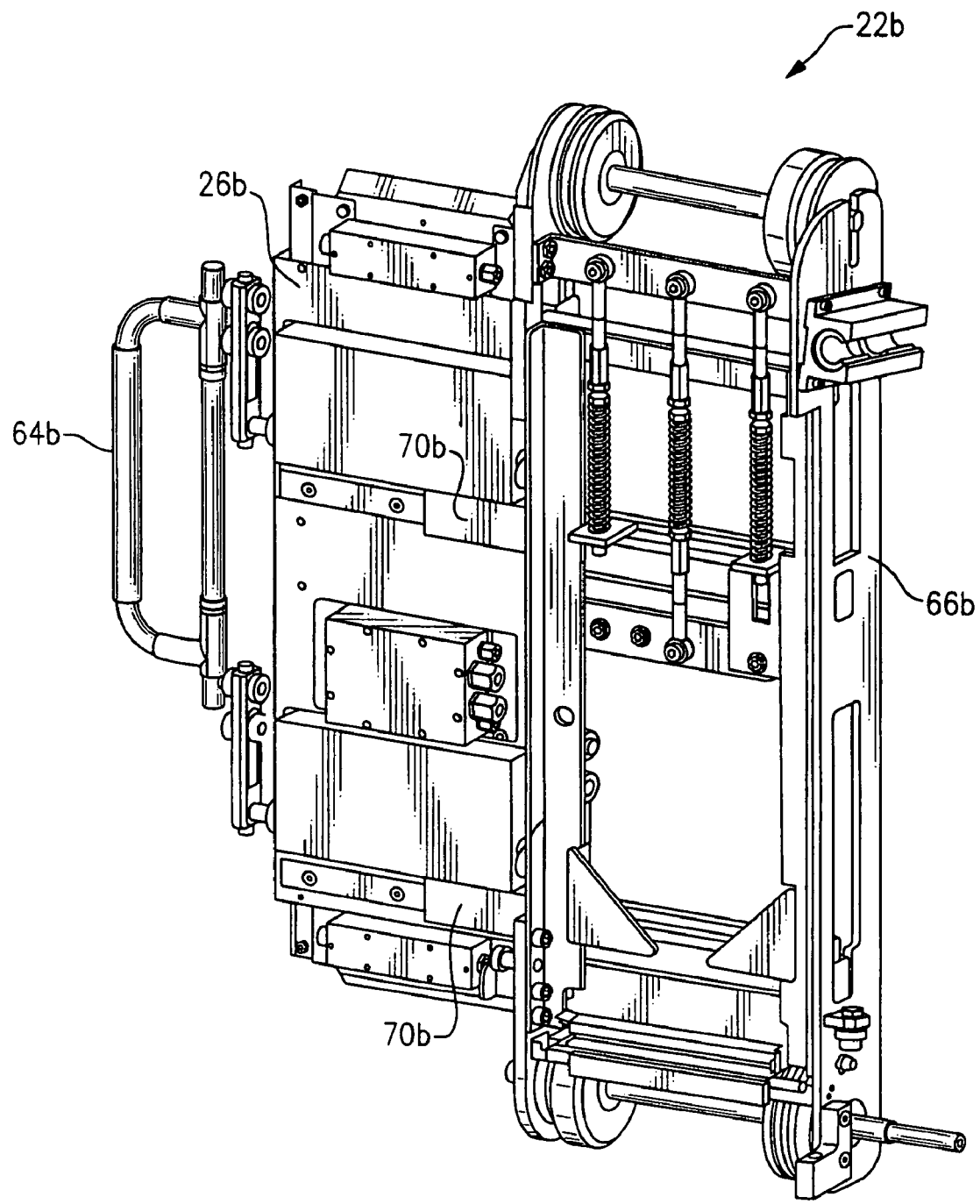
FIG. 4 schematically illustrates a rear perspective view of a grilling structure with the heating structure removed.
Figure 5:
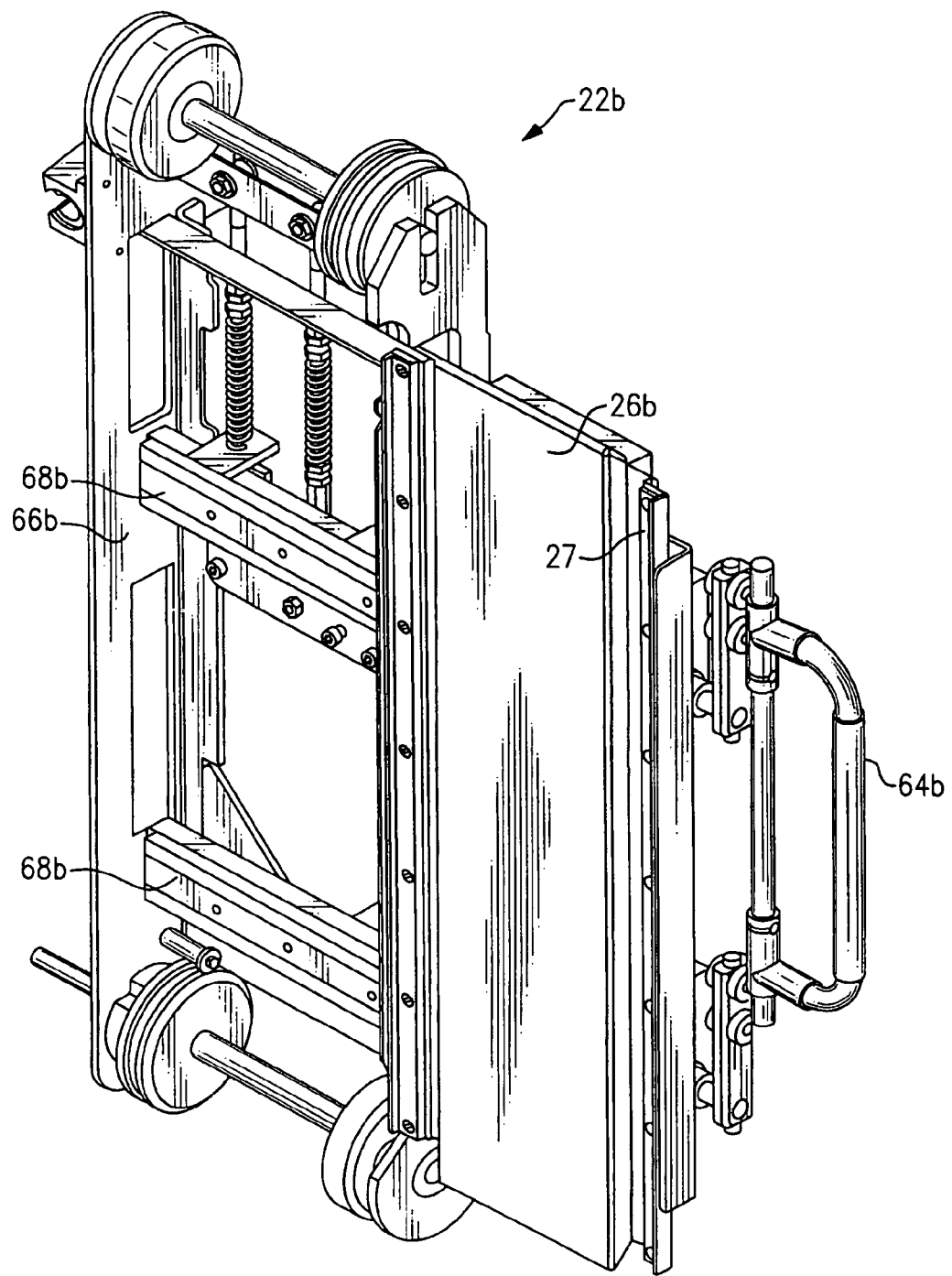
FIG. 5 schematically illustrates a front perspective view of the grilling structure with the heating structure removed.

FIGS. 4 and 5 illustrate the grilling structure 22b with the heating component 26b slid relative from the frame 66b of the grilling structure 22b. The frame 66b of the grilling structure 22b includes two tracks 68b, and the heating component includes two rails 70b each positioned to align with one of the tracks 68b. As shown in FIG. 6, the track 68b includes a trapezoidal shaped opening 72b, and the rail 70b of the heating component 26b is trapezoidal shaped. As the track 68b and the rail 70b are trapezoidal, the largest dimension g of the rail 70b is greater than the largest dimension f of the opening 72b of the track 68b, retaining the rail 70b in the track 68b. However, it is to be understood that other shapes of the rail 70b and the opening 72b are possible.

When the grilling component 20 is in use, the heating components 26a and 26b are in the position shown in FIG. 1. A latching mechanism 27 retains the heating components 26a and 26b in the in use position. When the latching mechanism 27 is released, the heating component 26b can slide relative to the frame 66b of the grilling structure 22b. In one example, the latching mechanism 27 is spring loaded. A user pulls the handle 64b to pull the heating component 26 from the grilling structure 22b. As the heating component 26b slides relative to the grilling structure 22b, the rail 70b slides and is retained within the track 68. When the heating component 26b is slid to the position illustrated in FIGS. 4 and 5, the heating component 26b can be removed and cleaned.

The heating component 26b is returned to the in use position by engaging the rail 70b in the opening 72b and sliding the heating component 26b into the grilling structure 22b in the reverse direction. The latching mechanism 27 engages the heating component 26b to retain the heating component 26b in the grilling structure 22b in the in use position.

Figure 7:
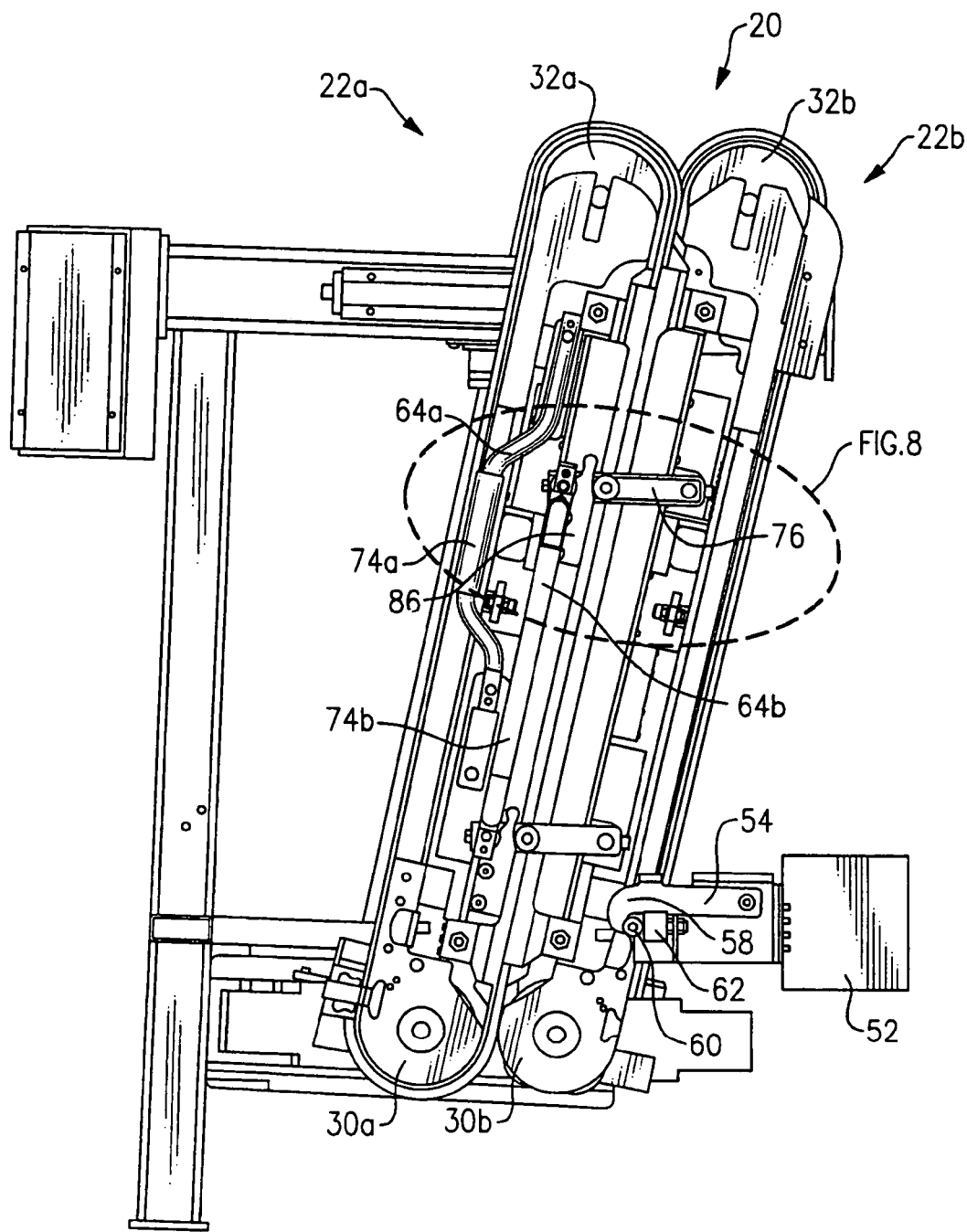
FIG. 7 schematically illustrates another side view of the grilling component.

The gap 24 separating the grilling structures 22a and 22b is adjustable between a small gap and a large gap. As shown in FIG. 7, the grilling structures 22a and 22b each include a handle 64a and 64b, respectively, having a gripping portion 74a and 74b, respectively, that is gripped and handled by an operator.

The handle 64a of the grilling structure 22a is stationary and does not move relative to the grilling structure 22a. The handle 64b of the grilling structure 22b is moveable relative to the grilling structure 22b between an attached position (shown in FIG. 1) and an unattached position (shown in FIG. 3).

Figure 8:
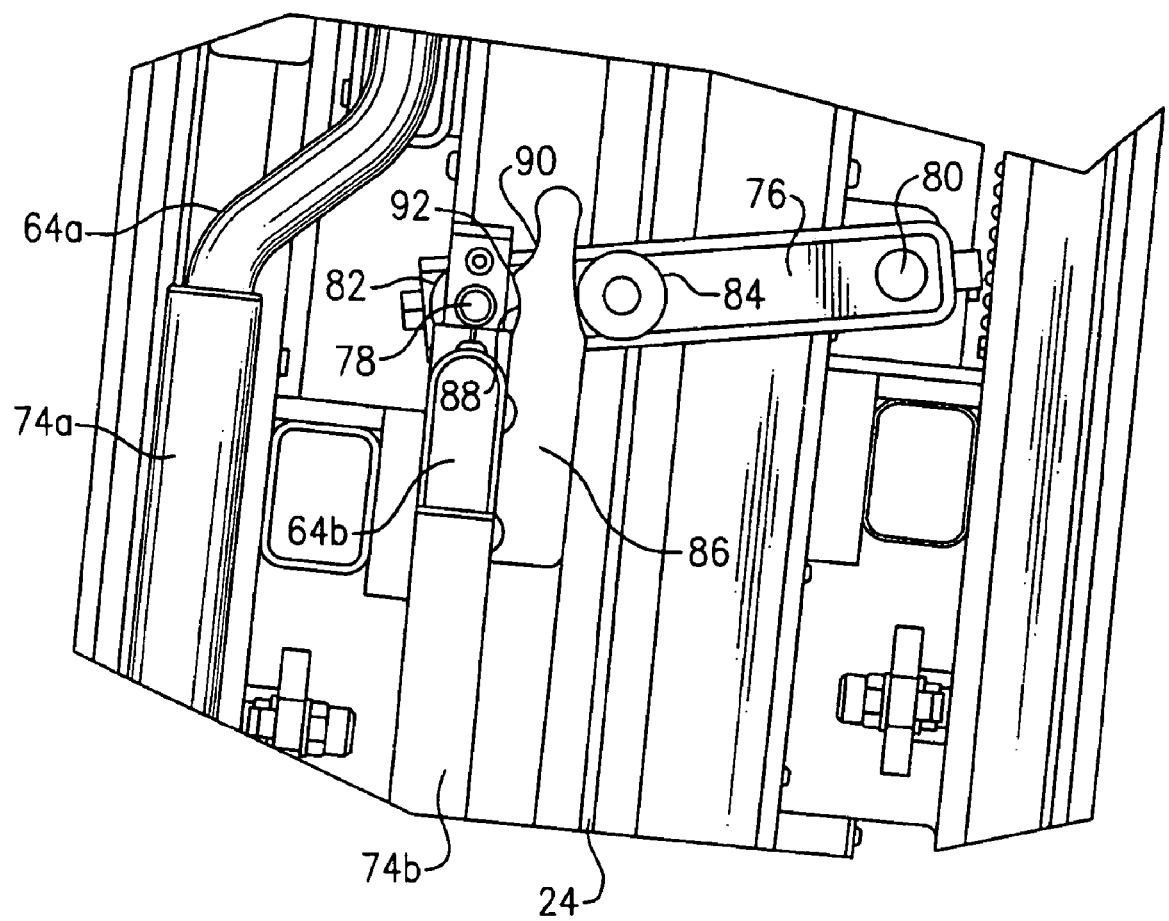
FIG. 8 schematically illustrates an enlarged view of a section of FIG. 7 showing the adjustment mechanism.

As further shown in FIG. 8, each end of the handle 64b is pivotally attached to an arm 76 at a pivot point 78. Each arm 76 is also pivotally attached to the grilling structure 22b at a pivot point 80. A first bearing 82 and a second bearing 84 are pivotally received in each arm 76. As shown in FIG. 1, the bearings 82 and 84 extend across the width of the grilling structure 22b and are received in an arm 76 on the opposing side of the grilling structure 22b. That is, there is an arm 76 on each side of the grilling structure 22b, and the bearings 82 and 84 extend between the arms 76 across the width of the grilling structure 22b. Preferably, there are two sets of arms 76.

Returning to FIG. 8, each grilling structure 22a includes an attachment arm 86 secured to the grilling structure 22a and positioned to engage with one of the arms 76 of the grilling structure 22b. The attachment arm 86 is not pivotally attached to grilling structure 22a. There is one attachment arm 86 of the grilling structure 22a for every arm 76 of the grilling structure 22b.

Each attachment arm 86 includes a first arched portion 88, a second arched portion 90, and a raised portion 92 between the arched portions 88 and 90. As shown, the first arched portion 88 is slightly farther away from the pivot point 80 of the arm 76 than the second arched portion 90.

Figure 3:
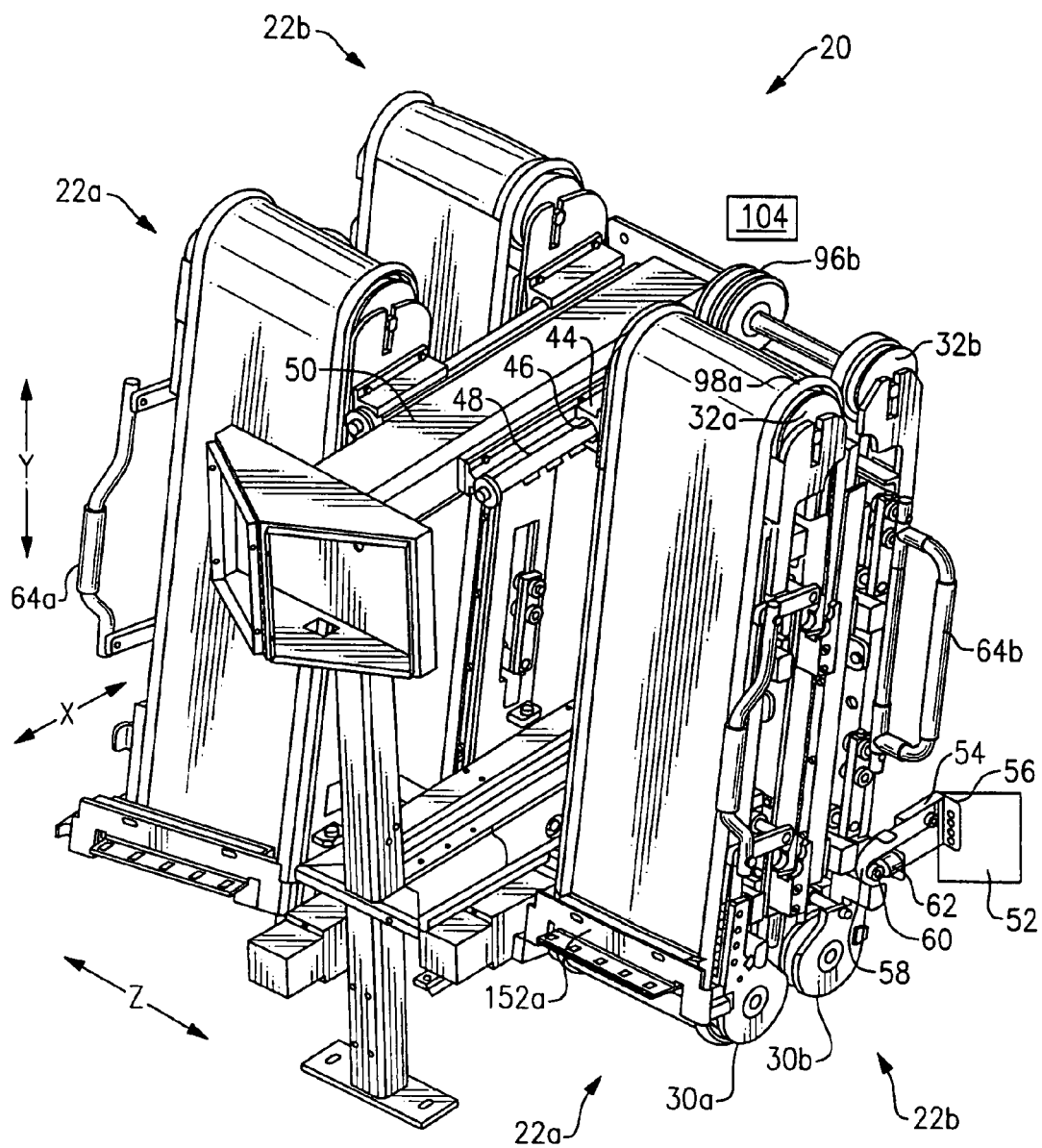
FIG. 3 schematically illustrates a perspective view of a grilling component of the present invention with the grilling structures separated.

FIG. 3 illustrates the handle 64b when the grilling structures 22a and 22b are in an unattached position. In the unattached position, the arm 76 is substantially parallel to the y-axis and the arm 76 does not engage the attachment arm 86 of the grilling structure 22a. When the grilling structure 22a and 22b are to be attached, the handle 64b of the grilling structure 22b is moved and pivoted by an operator towards the grilling structure 22a until the bearings 82 and 84 are received between one of the arched portions 88 and 90. In this position, the arm 76 is substantially parallel to the x-axis, as shown in FIG. 1, and the grilling structures 22a and 22b are attached.

Returning to FIG. 8, the first arched portion 88 is received between the bearings 82 and 84, forming a small gap 24 between the grilling structures 22a and 22b. In this position, the surface of the bearing 82 is received in the first arched portion 88. To increase the size of the gap 24, an operator moves the handle 64b upwardly in the y direction such that the second arched portion 90 is received between the bearings 82 and 84. As the handle 64b is moved upwardly, the arm 76 pivots about the pivot points 78 and 80 until the second arched portion 90 is received between the bearings 82 and 84. In this position, the surface of the bearing 82 is received the second arched portion 90. As the surface of the second arched portion 90 is closer to the pivot point 80 than the first arched portion 88, the gap 24 is slightly increased. That is, when the second arched portion 90 is received between the bearings 82 and 84, the grilling structure 22b is moved farther away from the grilling structure 22a, increasing the distance of the gap 24.

The raised portion 92 positioned between the arched portions 88 and 90 assists in retaining the arm 76 in the desired arched portion 88 and 90 and prevents the arm 76 from slipping out of the desired position. When the handle 64b is moved between the arched portions 88 and 90 to change the size of the gap 24, the movement must overcome the raised portion 92 to change between the large gap 24 and the small gap 24.

Figure 9:
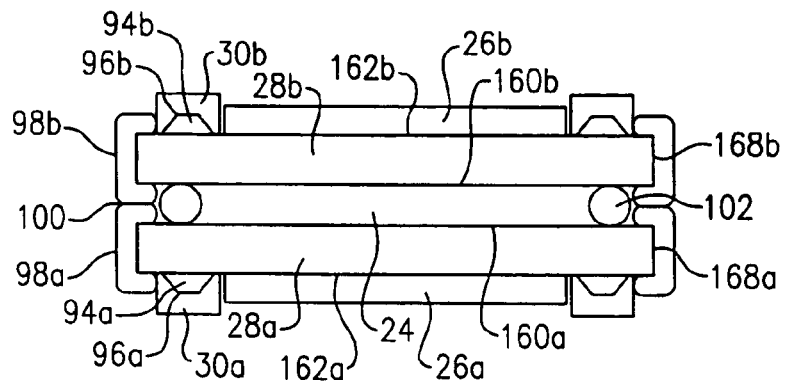
FIG. 9 schematically illustrates a cross-sectional view of the conveyor belt of the grilling components.

FIG. 9 schematically illustrates a cross-sectional view of the conveyor belts 28a and 28b of the respective grilling structures 22a and 22b of the grilling component 20. Each conveyor belt 28a and 28b includes a v-belt 94a and 94b, respectively, on the respective inner surface 160a and 160b of the respective conveyor belt 28a and 28b. In one example, the v-belts 94a and 94b are secured to the conveyor belts 28a and 28b by an adhesive. The v-belts 94a and 94b extend around the entire respective inner surface 160a and 160b inner surface of the conveyor belt 28a and 28b, respectively. That is, the v-belts 94a and 94b are continual and endless member. Preferably, there is a v-belt 94a and 94b proximate to both of the respective edges 168a and 168b of each conveyor belt 28a and 28b, respectively. That is, each conveyor belt 28a and 28b has two v-belts 94a and 94b, respectively.

Each v-belt 94a and 94b is received in a groove 96a and 96b of the drive pulley 30a and 30b, respectively, and a groove (not shown) in the non-drive pulley 32a and 32b, respectively. The grooves 96a and 96b are shaped and size to receive the v-belts 94a and 94b and retain the conveyor belts 28a and 28b on the pulleys 30a, 30b, 32a and 32b. The v-belts 94a and 94b also prevent lateral movement of the conveyor belts 28a and 28b, respectively. The contact of the v-belts 94a and 94b in the grooves 96a and 96b, respectively, of the pulleys 30a, 30b, 32a and 32b also acts as a seal to prevent grease and water from the food items 38 from leaking from the gap 24 and into the heating components 26a and 26b, respectively. Preferably, the v-belts 94a and 94b and the grooves 96a and 96b have a trapezoidal cross-section. However, it is to be understood that other shapes are possible.

Each conveyor belt 28a and 28b also includes an edge seal 98a and 98b, respectively. The edge seals 98a and 98b also contact the inner surface 160a and 160b and the outer surface 162a and 162b of the conveyor belts 28a and 28b and extend around the respective edges 168a and 168b. When the grilling structures 22a and 22b are attached, the edges seals 98a and 98b contact at a contact point 100, creating a seal that prevents the leakage of water and grease out of the gap 24. The edge seals 98a and 98b also extend around the entire edge 168a and 168b of the respective conveyor belt 28a and 28b. That is, the edges seal 98a and 98b are continual and are endless members.

The grilling component 20 further includes a hanging seal 102 that also prevents leakage of grease from the gap 24. Preferably, each set of grilling structures 22a and 22b includes two hangings seals 102. The hanging seal 102 is connected to a structure 104 (shown in FIG. 1) near the top of the grilling component 20. Preferably, the hanging seals 102 are tubular and made of Keviar. However, it is to be understood that the hanging seal 102 can be made of another material, and one skilled in the art would know what type of material to use. When the grilling structures 22a and 22b are attached, the hanging seals 102 are compressed between the conveyor belts 28a and 28b and positioned inwardly of the edge seals 98a and 98b to create a seal. The hanging seals 102 also act as a guide for the items of food 38 that travel in the gap 24.

Figure 10:
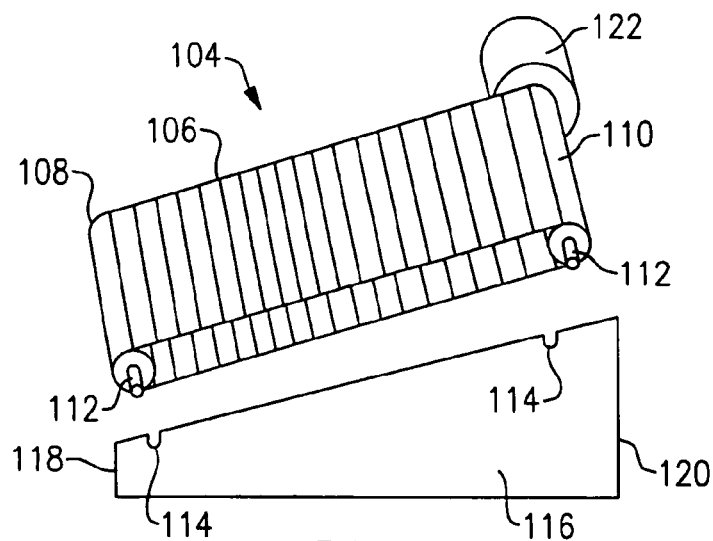
FIG. 10 schematically illustrates a side perspective view of the exit ramp.

Returning to FIG. 2, each item of food 38 exits the grilling component 20 through an exit opening 170 and slides down an exit ramp 104. As shown in FIG. 10, the exit ramp 104 is includes an endless member 106 positioned around a non-drive pulley 108 and a drive pulley 110. Preferably, the endless member 106 is a made of a plurality of wires. The non-drive pulley 108 and the drive pulley 110 each include a protrusion 112 at the opposing ends. The protrusions 112 of the pulleys 108 and 110 are received in an aperture 114 of an inclined ramp body 116. The ramp body 116 has a short end 118 and a tall end 120. Preferably, the tall end 120 of the ramp body 116 is positioned proximate to the bottom of the gap 24. As the endless member 106 moves, the protrusions 112 rotate in the aperture 114.

Figure 11:
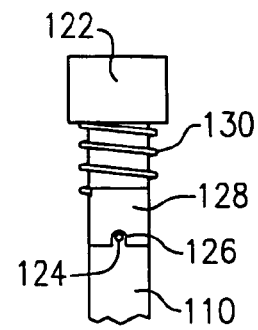
FIG. 11 schematically illustrates the attachment of the motor to the drive-pulley of the exit ramp.

As further shown in FIG. 11, a motor 122 drives the drive pulley 110 to move the endless member 106 around the pulleys 108 and 110. A connecting portion 128 is attached to the motor 112 by a resilient member 130. Preferably, the resilient member 130 is a spring. The drive pulley 110 includes a pin 124 received in a slot 126 of the connecting portion 128. The resilient member 130 biases the connecting portion 128 towards the drive pulley 110 to retain the pin 124 in the slot 126, connecting the motor 122 to the drive pulley 110. Therefore, as the motor 122 turns the connecting portion 128, the drive pulley 110 turns to move the endless member 106.

Figure 12:
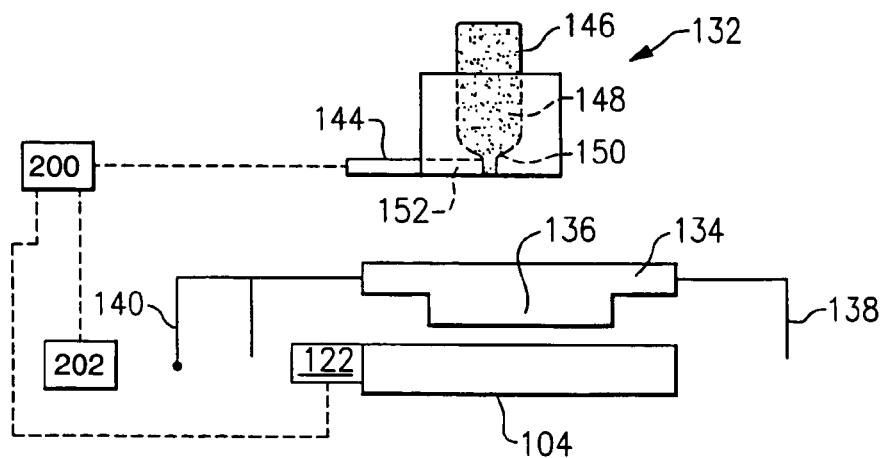
FIG. 12 schematically illustrates the seasoning system of the present invention.

As shown in FIG. 12, the grilling component 20 further includes a seasoning system 132. The seasoning system 132 includes a pivotal flap 134 having a protruding portion 136 in the path of food items 38 as the food items 38 travel along the exit ramp 104. The arms 138 of the flap 134 are attached to the ramp body 116.

When a food item 38 travels down the exit ramp 104, the food item 38 eventually contacts the protruding portion 136 of the flap 134, pivoting the flap 134 approximately 90° from the position shown in FIG. 12. When the flap 134 pivots, an arm 140 attached to the flap 134 also moves and is detected by a sensor 142. The sensor 142 sends a signal to a control 144 that the sensor 142 has been triggered. The control 200 sends a signal to activate a solenoid valve 144 and to stop the motor 122. When the motor 122 stops, the endless member 106 stops moving, stopping the movement of the food item 38.

The seasoning system 132 further includes a bottle 146 of seasoning 148, such as salt, having an opening 150. The opening 150 is positioned substantially over the flap 134. When the solenoid valve 144 is activated, the solenoid valve 144 removes a stop 202 from the opening 150 of the bottle 146, allowing the seasoning 148 to exit the opening 150 and dispense on the food item 38 below.

After the seasoning 148 dispenses, the solenoid valve 144 returns to the non-activated state to prevent seasoning 148 from dispensing from the bottle 146. The control 144 sends a signal to activate the motor 122 and resume movement of the endless member 106 and the food item 38. The cooked food item 38 can then be removed for serving.

Returning to FIG. 1, each grilling structure 22a and 22b also includes a cleaning device 152a and 152b, respectively. The cleaning devices 152a and 152b contact the respective conveyor belt 28a and 28b to remove any grease and food that accumulates on the conveyor belt 28a and 28b during operation.

The grill component 20 of the present invention can be used with an automated grill, such as described in co-pending patent application Ser. No. 10/124,629 entitled "Automated Grill" filed on Apr. 17, 2002. The grilling component 20 can also be used with an automated freezer component, such as described in co-pending patent application Ser. No. 10/725,954 entitled "Automated Freezer Component" filed on Dec. 2, 2003.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A grilling component for grilling an item comprising:
   a first grilling structure including a first heating structure, a first endless member moveable around said first heating structure, and a first surface heated by said first heating structure;
   a second grilling structure including a second heating structure, a second endless member moveable around said second heating structure, a second surface defining a plane and heated by said second heating structure, and a beveled portion, wherein said beveled portion extends from said plane at an angle;
   a gap defined between said first grilling structure and said second grilling structure; and
   a frame, wherein said first grilling structure and said second grilling structure each include a slider that is slidable along said frame to move said first grilling component and said second grilling component relative to said frame in a substantially horizontal direction.

2. The grilling component as recited in claim 1 wherein said angle is approximately 0.8°.

3. The grilling component as recited in claim 1 wherein said beveled portion is heated by said second heating structure.

4. The grilling component as recited in claim 1 wherein said second grilling component is removably attached to a second component, and said first grilling component is slidable relative to said second grilling component in said substantially horizontal direction.

5. The grilling component as recited in claim 1 wherein said gap between said first grilling structure and said second grilling structure is adjustable.

6. The grilling component as recited in claim 1 further including an exit ramp positioned proximate to an exit of said gap of said grilling component, a sensor, and a seasoning device to dispense seasoning, wherein said seasoning device dispenses said seasoning on the item when said sensor detects the item is located on said exit ramp.

7. The grilling component as recited in claim 1 wherein said first grilling structure and said second grilling structure extend approximately 5° from a vertical plane.

8. The grilling component as recited in claim 1 wherein the item is grilled when traveling in said gap.

9. A grilling component for grilling an item comprising:
a first grilling structure including a first heating structure, a first endless member moveable around said first heating structure, and a first surface heated by said first heating structure;
a second grilling structure including a second heating structure, a second endless member moveable around said second heating structure, a second surface defining a plane and heated by said second heating structure, and a beveled portion, wherein said beveled portion extends from said plane at an angle; and
a gap defined between said first grilling structure and said second grilling structure,
wherein said first grilling structure and said second grilling structure each include a track, and said first heating structure and said second heating structure each include a rail received in said track, and
wherein said first heating structure and said second heating structure are slidable relative to said first grilling structure and said second grilling structure, respectively, to move said first heating structure and said second heating structure relative to said first grilling structure and said second grilling structure, respectively.

10. A grilling component for grilling an item comprising:
a first grilling structure including a first heating structure, a first endless member moveable around said first heating structure, and a first surface heated by said first heating structure;
a second grilling structure including a second heating structure, a second endless member moveable around said second heating structure, a second surface defining a plane and heated by said second heating structure, and a beveled portion, wherein said beveled portion extends from said plane at an angle; and
a gap defined between said first grilling structure and said second grilling structure,
wherein said first grilling structure includes a first arm having a first arched surface and a second arched surface,
wherein said second grilling structure includes a second arm pivotally attached to said second grilling structure and including two bearings, and one of said first arched surface and said second arched surface is received between said two bearings when said grilling component is in an attached position, and
wherein said gap has a first dimension when said first arched surface is positioned between said two bearings and said gap has a second dimension when said second arched surface is positioned between said two bearings.

11. The grilling component as recited in claim 10 further including two of said first arm each located on one of an opposing first side of said first grilling structure and two of said second arm each located on one of an opposing second side of said second grilling structure.

12. A grilling component for grilling an item comprising:
a first grilling structure including a first heating structure, a first endless member moveable around said first heating structure, and a first surface heated by said first heating structure;
a second grilling structure including a second heating structure, a second endless member moveable around said second heating structure, a second surface defining a plane and heated by said second heating structure, and a beveled portion, wherein said beveled portion extends from said plane at an angle; and
a gap defined between said first grilling structure and said second grilling structure,
wherein each of said first grilling structure and said second grilling structure include a drive pulley having a drive pulley groove and a non-drive pulley having a non-drive pulley groove,
wherein said first endless member and said second endless member each include two v-belts on an inner surface of each said first endless member and said second endless member, and
wherein one of said two v-belts of said first endless member and said second endless member engage said drive pulley groove of said drive pulley of each of said first grilling structure and said second grilling structure and the other of said two v-belts of said first endless member and said second endless member engage said non-drive pulley groove of said non-drive pulley of each of said first grilling structure and said second grilling structure.

13. A grilling component for grilling an item comprising:
a first grilling structure including a first heating structure, a first endless member moveable around said first heating structure, and a first surface heated by said first heating structure;
a second grilling structure including a second heating structure, a second endless member moveable around said second heating structure, a second surface defining a plane and heated by said second heating structure, and a beveled portion, wherein said beveled portion extends from said plane at an angle; and
a gap defined between said first grilling structure and said second grilling structure,
wherein said first endless member includes a pair of first opposing edges and a first edge seal is located on each of the pair of first opposing edges, and
wherein said second endless member includes a pair of second opposing edges and a second edge seal is located on each of the pair of second opposing edges.

14. The grilling component as recited in claim 13 wherein each of said first edge seals contact one of said second edge seals at a contact point.

15. The grilling component as recited in claim 14 further including a seal positioned between said first heating component and said second heating component.

16. A grilling component for grilling an item comprising:
a first grilling structure including a first heating structure, a first endless member moveable around said first heating structure, and a first slider;
a second grilling structure including a second heating structure, a second endless member moveable around said second heating structure, and a second slider;
a gap defined between said first grilling structure and said second grilling structure, wherein the item is grilled while traveling in said gap; and
a frame, wherein said first slider and said second slider are slidable along said frame to move said first grilling component and said second grilling component in a substantially horizontal direction relative to said frame.

17. The grilling component as recited in claim 16 wherein said second grilling component is removably attached to a second component, and said first grilling component is slidable relative to said second grilling component in said substantially horizontal direction.

18. A grilling component for grilling an item comprising:
a first grilling structure including a first heating structure having a first rail, a first endless member moveable around said first heating structure, and a first track, wherein said first rail is slidably received in said first track and said first heating structure is slidable relative to said first grilling structure by sliding said first rail relative to said first track;

a second grilling structure including a second heating structure having a second rail, a second endless member moveable around said second heating structure, and a second track, wherein said second rail is slidably received in said second track and said second heating structure is slidable relative to said second grilling structure by sliding said second rail relative to said second track; and a gap defined between said first grilling structure and said second grilling structure, and wherein the item is grilled while traveling in said gap.

* * * * *